(12) United States Patent
Kurita (10) Patent No.: US 7,558,462 B2
(45) Date of Patent: Jul. 7, 2009

(54) REPRODUCTION DEVICE AND CONTENT INFORMATION REPRODUCTION METHOD

(75) Inventor: Tadashi Kurita, Kanagawa (JP)

(73) Assignee: Sony Corporation, Tokyo (JP)

( * ) Notice: Subject to any disclaimer, the term of this patent is extended or adjusted under 35 U.S.C. 154(b) by 729 days.

(21) Appl. No.: 10/520,151

(22) PCT Filed: Jul. 1, 2003

(86) PCT No.: PCT/JP03/08350

§ 371 (c)(1),
(2), (4) Date: Jan. 3, 2005

(87) PCT Pub. No.: WO2004/006254

PCT Pub. Date: Jan. 15, 2004

(65) Prior Publication Data

US 2006/0120243 A1    Jun. 8, 2006

(30) Foreign Application Priority Data

Jul. 4, 2002    (JP) .............................. 2002-196143

(51) Int. Cl.
*H04N 5/76* (2006.01)
*H04N 7/00* (2006.01)
*H04N 5/45* (2006.01)

(52) U.S. Cl. ........................................ 386/46; 348/565
(58) Field of Classification Search .................. 386/46, 386/65, 66, 95, 98, 102, 109; 348/565
See application file for complete search history.

(56) References Cited

U.S. PATENT DOCUMENTS

| | | | | |
|---|---|---|---|---|
| 4,782,391 A | * | 11/1988 | McNeely et al. | 348/565 |
| 4,796,089 A | * | 1/1989 | Imai et al. | 348/565 |
| 5,477,396 A | * | 12/1995 | Fukami et al. | 386/81 |
| 5,608,463 A | * | 3/1997 | Ohmori | 348/540 |
| 5,748,594 A | | 5/1998 | Nishio et al. | |
| 5,969,769 A | * | 10/1999 | Hamadate | 348/568 |
| 6,307,597 B1 | * | 10/2001 | Patton et al. | 348/565 |
| 6,310,566 B1 | * | 10/2001 | McNeely | 341/123 |
| 6,477,204 B1 | * | 11/2002 | Fukushima et al. | 375/240.28 |
| 6,556,252 B1 | * | 4/2003 | Kim | 348/565 |

(Continued)

FOREIGN PATENT DOCUMENTS

EP    0 758 125    1/2002

(Continued)

*Primary Examiner*—Thai Tran
*Assistant Examiner*—Gelek Topgyal
(74) *Attorney, Agent, or Firm*—Frommer Lawrence & Haug LLP; William S. Frommer; Thomas F. Presson (57) ABSTRACT

A reproduction apparatus and a content information reproduction method for simultaneous reproduction from two recording media and instantaneous audio switching. A frequency-division section and another frequency-division section each frequency-divide a master clock provided by an oscillation section at a predetermined frequency-division ratio so as to generate clocks. A hard disk uses the clocks coming from the frequency division section as a basis to reproduce audio/visual AV data, and an optical disk uses the clocks coming from the frequency-division section as a basis to reproduce the AV data. In response to a user's instruction, when audio switching is performed for output to a speaker, a clock selection section switches a clock to be supplied to a D/A converter into the clock provided by the frequency-division section, or the clock provided by the frequency-division section.

15 Claims, 6 Drawing Sheets

U.S. PATENT DOCUMENTS

| | | | |
|---|---|---|---|
| 6,697,123 B2 * | 2/2004 | Janevski et al. | 348/565 |
| 6,697,124 B2 * | 2/2004 | Dimitrova et al. | 348/565 |
| 6,784,945 B2 * | 8/2004 | Norsworthy et al. | 348/731 |
| 7,102,692 B1 * | 9/2006 | Carlsgaard et al. | 348/572 |
| 2003/0223731 A1 * | 12/2003 | Carlsgaard et al. | 386/46 |

FOREIGN PATENT DOCUMENTS

| | | |
|---|---|---|
| EP | 1 213 927 | 6/2002 |
| JP | 63-317982 | 12/1988 |
| JP | 5-28657 | 2/1993 |
| JP | 6-338138 | 12/1994 |
| JP | 9-55026 | 2/1997 |
| JP | 10-283735 | 10/1998 |
| JP | 2002-170324 | 6/2002 |

* cited by examiner

REPRODUCTION DEVICE AND CONTENT INFORMATION REPRODUCTION METHOD

TECHNICAL FIELD

The present invention relates to reproduction apparatuses and content information reproduction methods and, more specifically, to a reproduction apparatus and a content information reproduction method capable of instantaneous content output switching.

BACKGROUND ART

As a recording/reproduction apparatus for content information, a possible type includes two recording media. For example, one is a hard disk, and the other is an optical disk.

The hard disk is larger in capacity than the optical disk (e.g., 80 GB to 160 GB), and thus has such characteristics as enabling recording or reproduction of content information without preparation or forethought about how much capacity is left available. Moreover, there is no need for disk attachment from outside, thereby enhancing usability due to no cost therefor, and no more trouble for disk insertion for every recording or reproduction.

On the other hand, as to the optical disk, through recording of content information onto the optical disk, the content information can be extracted from the recording/reproduction apparatus to carry around. Also, in other recording/reproduction apparatuses, thus extracted content information can be reproduced, or other content information can be recorded onto the same optical disk. The problem here is that, for recording or reproduction of the content information as such, there needs to attach a disk to the recording/reproduction apparatus.

Another problem is that the optical disk is expensive, exemplarily with a DVD-R (Digital Versatile Disk) of 4.7 GB capacity, a write-once disk is about 1000 yen, and a rewritable disk is about 2000 to 3000 yen. Further, the capacity, per disk, available for writing is relatively small compared with a hard disk, and thus recording has to be always done with a consideration for capacity availability.

With the characteristics of hard disk and optical disk as such, the usage varies among cases, e.g., in a case of requiring recording only temporarily or requiring viewing only a few times, a hard disk may be selected for recording, and in a case of requiring permanent or semipermanent storage or requiring recording of any edition result, an optical disk may be selected for recording.

Herein, when a hard disk is selected for data recording, the frequency of a sampling clock is set to 48 kHz. On the other hand, for DVD (Digital Versatile Disk) reproduction, the frequency of a sampling clock is set to 48 kHz or 96 kHz, and with a CD (Compact Disk) or a video CD, 44.1 kHz is used.

Conventionally, such a sampling clock has been generated by changing the frequency of a single master clock itself.

As a result, in an exemplary case where a hard disk is recorded with data using a clock of 48 kHz frequency while a CD is reproduced using a clock of 44.1 kHz frequency, the need arises to change the frequency setting made to the master clock every time mode switching is made from recording to reproduction. Therefore, this causes a problem of taking time to derive clock stabilization, and as a result, output audio is interrupted at every switching, momentarily failing in smooth audio switching.

The present invention is proposed in consideration of such circumstances, and an object thereof is to provide instantaneous content switching.

DISCLOSURE OF THE INVENTION

The present invention is proposed in consideration of such circumstances, and an object thereof is to provide instantaneous content switching.

A reproduction apparatus of the present invention is characterized in including: frequency division means for frequency-dividing a predetermined master clock for outputting a first clock of a first frequency, and frequency-dividing the master clock for outputting a second clock of a second frequency different from the first frequency; first content information output means for outputting first content information to be reproduced based on the first clock; second content information output means for outputting second content information to be reproduced based on the second clock; and reproduction means for making a selection between the first content information and the second content information, and reproducing the selected content information based on either the first clock or the second clock whichever corresponding to the selected content information.

Out of the first and second content information, at least either of those can be regarded as content information having been recorded on a recording medium.

Out of the first and second content information, at least either of those can be regarded as content information having been provided from outside the reproduction apparatus.

The content information can be so configured as to include a signal as a result of multiplexing a video signal to an audio signal.

The reproduction means is so structured as to combine, for reproduction, a video signal of the first content information and a video signal of the second content information, and based on either the first clock or the second clock whichever corresponding to the selected content information, reproduce an audio signal of the selected content information.

A content information reproduction method of the present invention is characterized in including: a clock frequency-division step of frequency-dividing a predetermined master clock for outputting a first clock of a first frequency, and frequency-dividing the master clock for outputting a second clock of a second frequency different from the first frequency; and a reproduction step of receiving first content information to be reproduced based on the first clock and second content information to be reproduced based on the second clock, making a selection between the first content information and the second content information, and reproducing the selected content information based on either the first clock or the second clock whichever corresponding to the selected content information.

A first clock of a first frequency is outputted by frequency-dividing a predetermined master clock, a clock of a second frequency different from the first frequency is outputted thereby, a selection is made between first content information and second content information, and the selected content information is reproduced based on either the first clock or the second clock which ever corresponding to the selected content information.

BEST MODE FOR CARRYING OUT THE INVENTION

Figure 1:
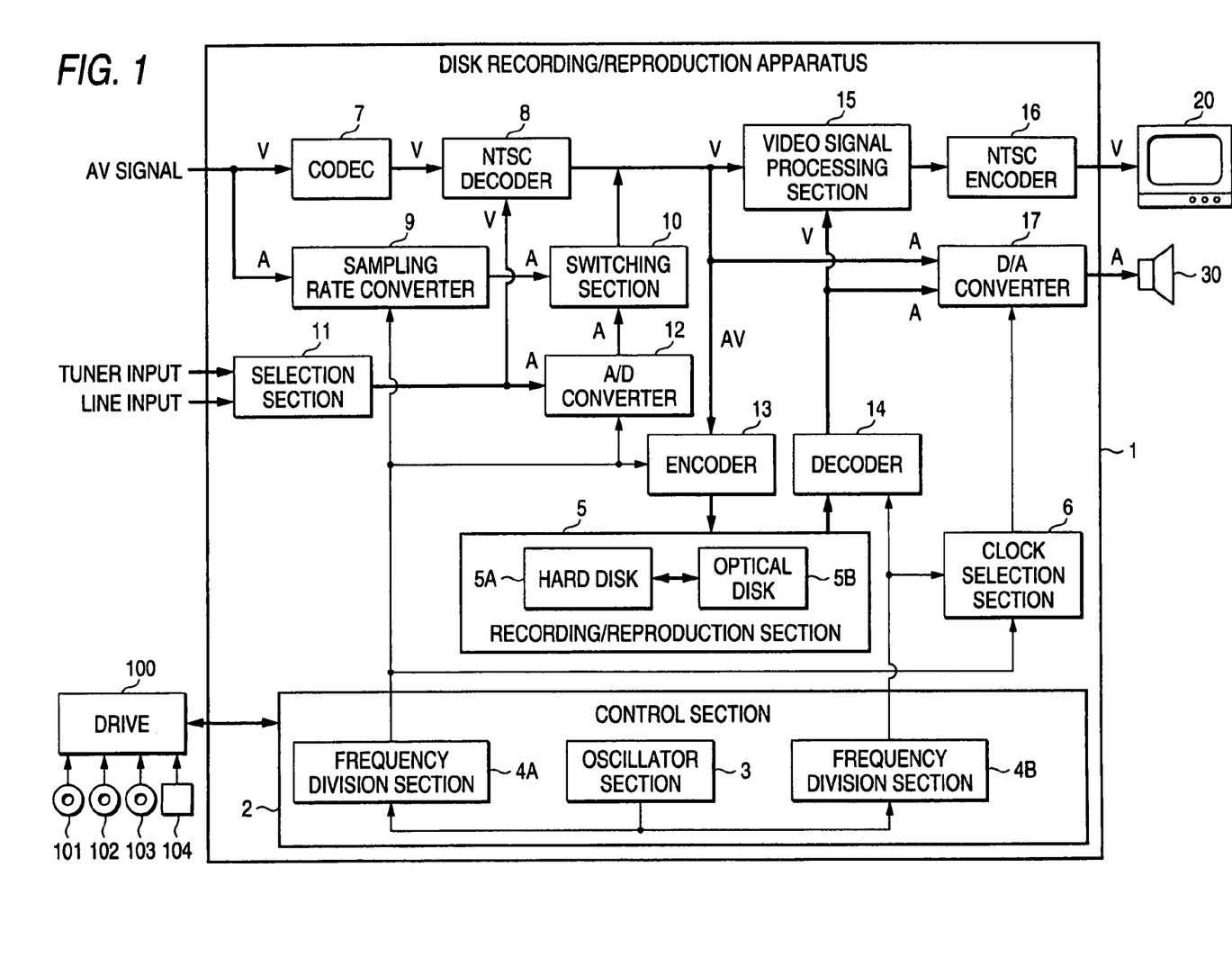
FIG. 1 is a diagram showing an exemplary structure of a disk recording/reproduction apparatus of an embodiment to which the present invention is applied.

FIG. 1 shows an exemplary structure of a disk recording/reproduction apparatus to which the present invention is applied.

In this disk recording/reproduction apparatus 1, a recording/reproduction section 5 records or reproduces content information exemplified by AV (Audio Video) signals with respect to a hard disk 5A or an optical disk 5B. AV signals recorded to the recording/reproduction section 5 or AV signals reproduced from the recording/reproduction section 5 are output to a monitor 20 and a speaker 30, both of which are provided outside. A user specifies over a user interface (not shown) which to output to the monitor 20 and the speaker 30, the AV signals in a recording or reproduction process.

Based on a signal coming from the user interface corresponding to such an user's operation, a control section 2 exercises control over components of the disk recording/reproduction apparatus 1. For example, using an oscillation section 3 provided inside of the control section 2, the control section 2 generates a master clock of a fixed frequency for supply to a frequency division section 4A and another frequency division section 4B.

In the frequency division section 4A, a clock (clock used for recording or reproduction of the hard disk 5A) derived by frequency-dividing the master clock thus supplied from the oscillation section 3 at a predetermined frequency-division ratio is provided to a sampling rate converter 9, an A/D converter 12, an encoder 13, and a clock selection section 6.

On the other hand, in the frequency division section 4B, a clock (clock used for recording or reproduction of the optical disk 5B) derived by frequency-dividing the master clock supplied from the oscillation section 3 at the predetermined frequency-division ratio is provided to a decoder 14, and the clock selection section 6.

For example, digital AV signals coming over an i.LINK (trademark), or digital AV signals received and output by a digital BS (Broadcasting Satellite)/CS (Communications Satellite) tuner (not shown) are input to a codec 7. Out of thus input digital AV (Audio Video) signals, the codec 7 clears (expands) compression of video signals for output to an NTSC decoder 8.

Out of the input digital AV signals, the sampling rate converter 9 converts the sampling rate of digital audio signals into a sampling rate different therefrom for output to a switching section 10.

A selection section 11 makes a selection between inputs from an analog tuner that is not shown or analog line inputs based on the user's operation, and thereamong, outputs analog video signals to the NTSC decoder 8, and analog audio signals to the A/D converter 12.

The A/D converter 12 subjects thus input analog audio signals to A/D conversion, and outputs the conversion result to the switching section 10.

The switching section 10 makes a selection between the digital audio signals provided by the sampling rate converter 9 and the digital audio signals provided by the A/D converter 12 based on the user's instruction.

The NTSC decoder 8 converts the digital video signals provided by the codec 7 or the analog video signals provided by the switching section 11 into digital video signals of the NTSC system. The conversion result is combined together with the digital audio signals provided by the switching section 10 for output.

Digital AV signals as a result of such signal combination are input to the encoder 13, and therein, encoded by a predetermined system. The encoding result is then supplied to the recording/reproduction section 5, and recoded on the hard disk 5A, for example.

On the other hand, out of the digital AV signals as a result of signal combination, the digital video signals are supplied also to a video signal processing section 15. Moreover, to the video signal processing section 15, supplied are the digital video signals as a part of the digital AV signals decoded by the decoder 14 after reproduced from the hard disk 5A or the optical disk 5B by the recording/reproduction section 5.

The video signal processing section 15 combines, into a single frame image, the digital video signals supplied from both the NTSC decoder 8 and the decoder 14, and supplies the result to the NTSC encoder 16. The NTSC encoder 16 then encodes the supplied digital video signals, and outputs the resulting video signal of the NTSC system to the monitor 20.

Either the digital audio signals as a part of the digital AV signals provided from the NTSC decoder 8 or the digital AV signals provided by the decoder 14, the D/A converter 17 subjects those to D/A conversion, and outputs the conversion result to the speaker 30.

To the control section 2, a drive 100 is connected on an as needed basis. The drive 100 is attached with a magnetic disk 101 (floppy disk included), an optical disk 102 (CD-ROM (Compact Disk—Read Only Memory), DVD (Digital Versatile Disk) included), an magneto-optical disk 103 (MD (Mini-Disk) included), or a semiconductor memory 104 on an as needed basis for data transmission and reception.

Figure 2:
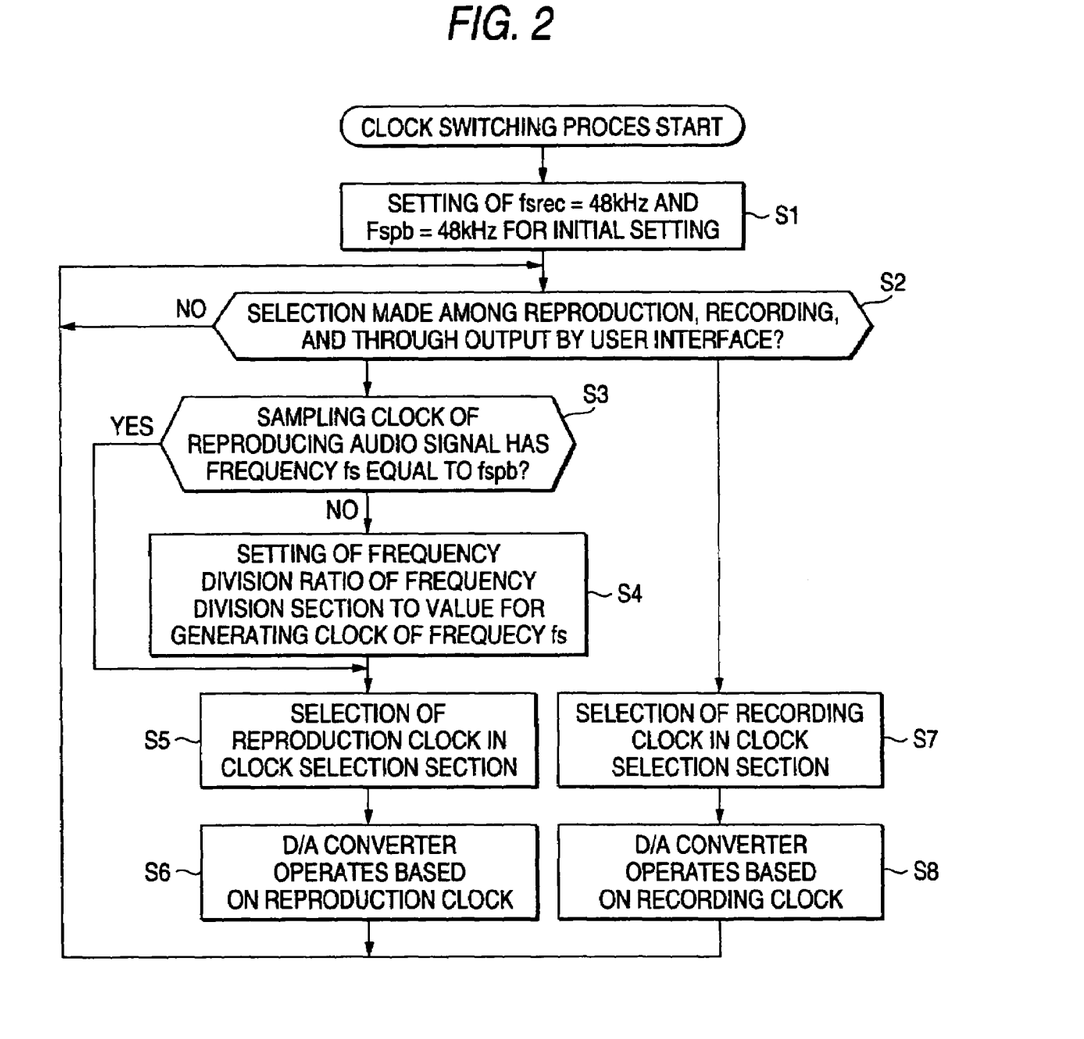
FIG. 2 is a flowchart for illustrating a clock switching process of the disk recording/reproduction apparatus of FIG. 1.

By referring to the flowchart of FIG. 2, described next is a sampling clock switching process to be executed to a recording medium. Here, this process is started responsively when the disk recording/reproduction apparatus 1 is turned on.

In step S1, the control section 2 initially sets the frequency fsrec of a recording clock to 48 kHz, and the frequency fspb of a reproduction clock to 48 kHz.

In step S2, the control section 2 makes a determination over a user interface whether a user has issued an instruction for data reproduction, recording, or through output.

Here, "recording" means to recode, as described above, the data having been subjected to the encode process by the encoder 13 to the hard disk 5A. The data thus recorded on the hard disk 5A is transferred to the optical disk 5B for recording on an as need basis, e.g., in response to the user's request.

Further, "reproduction" means to reproduce the data having been recorded on the optical disk 5B.

Still further, "through output" means to output, to the monitor 20 and the speaker 30, the AV signals having been provided to the disk recording/reproduction apparatus 1 without recording to the recording/reproduction section 5.

Until the user issues an instruction about his or her selection among reproduction, recording, or through output, the process of this step S2 is repeated.

In step S2, when the determination is made that selected is reproduction, the control section 2 makes a determination in step S3 whether or not the audio signal to be reproduced from the optical disk 5B has the sampling clock frequency fs equal to the currently-set reproduction clock frequency fspb. When determined as not equal, the procedure goes to step S4. In an exemplary case where the optical disk 5B attached to the recording/reproduction section 5 for reproduction in due time is an CD, the sampling frequency thereof is 44.1 kHz. On the other hand, when the optical disk 5A is a DVD, the sampling clock frequency thereof is 48 kHz or 96 kHz.

If determined in step S3 that the audio signal to be reproduced has the sampling clock frequency fs not equal to the currently-set reproduction clock frequency fspb, in step S4, the control section 2 sets the frequency-division ratio of the frequency division section 4B to a value for generating a clock of the frequency fs. That is, when the optical disk 5B for reproduction is an CD, the frequency-division ratio is so set as to generate a clock having the frequency of 44.1 kHz, and with a DVD, the frequency-division ratio is so set as to generate a clock having the frequency of 48 kHz or 96 kHz.

If determined in step 3 that the audio signal to be reproduced has the sampling clock frequency fs equal to the currently-set reproduction clock frequency fspb, the procedure skips the process of step S4.

After the process of step S4 is through, or if determined in step 3 that the audio signal to be reproduced has the sampling clock frequency fs equal to the currently-set reproduction clock frequency fspb, in step S5, the clock selection section 6 selects the reproduction clock provided by the frequency division section 4B based on the instruction coming from the control section 2.

In step S6, in synchronization with the incoming reproduction clock, the D/A converter 17 subjects, to D/A conversion, the audio signals provided by the decoder 14, and outputs the conversion result to the speaker 30.

To be more specific, in such a case, the recording/reproduction section 5 outputs the AV data reproduced from the optical disk 5B to the decoder 14 for decoding therein. Out of the AV signals as a result of decoding performed in the decoder 14, video signals are supplied to the NTSC encoder 16 via the video signal processing section 15, and then converted into video signal of the NTSC system. The conversion result is then output to the monitor 20 for display thereon.

On the other hand, the audio data provided by the decoder 14 is first subjected to D/A conversion by the D/A converter 17, and then the conversion result is output from the speaker 30.

Thereafter, the procedure returns to step S2 to repeat the processes onward.

On the other hand, in step S2, if determined that the user made a selection of recording or through output via the user interface, in step S7, the clock selection section 6 uses the instruction of the control section 2 as a basis to select the recording clock provided by the frequency division section 4A.

That is, in the disk recording/reproduction apparatus 1, the data is recorded on the hard disk 5A for a time. To make data recording on the hard disk 5A as such, the recording clock has the frequency of 48 kHz. The frequency-division ratio of the frequency-division section 4A has been already applied with frequency-division ratio control in the process of step S1 so as to generate a recording clock having the frequency of 48 kHz. The recording clock thus generated by the frequency division section 4A is supplied to components to be needed for data recording on the hard disk 5A.

That is, for example, the codec 7 first expands the video signals as a part of the incoming AV signals, and then outputs the expansion result to the NTSC decoder 8. The sampling rate converter 9 subjects the audio signals as a part of the incoming AV signals to sampling rate conversion using the clock having the frequency of 48 kHz provided from the frequency division section 4A. The conversion result is then output to the switching section 10.

The NTSC decoder 8 decodes the incoming video signals, and combines the resulting video signals of the NTSC system with the audio signals output from the switching section 10. In a case where an instruction has been made for recording, the AV signals as a result of signal combination are first encoded by the encoder 13, and then supplied to the hard disk 5A for recording thereon.

In an alternative manner, the video signals corresponding to tuner input or line input whichever selected by the selection section 11 are supplied to the NTSC decoder 8, and then decoded to be video signals of the NTSC system. The A/D converter 12 subjects, to A/D conversion, the audio signals as a part of the AV signals provided by the selection section 11, and then forwards the conversion result to the NTSC decoder 8 via the switching section 10 for signal combination with the video signals. Then, if an instruction has been made for recording, the AV signals as a result of signal combination are first encoded by the encoder 13, and then provided to the hard disk 5A for recording thereon.

In step S8, the D/A converter 17 synchronizes with the recording clock generated by the frequency division section 4A and selected by the clock selection section 6 so that the audio signals (audio signals in a recording process, or audio signals not recorded but put through) as a part of the AV signals provided by the NTSC decoder 8 are subjected to D/A conversion, and the conversion result is output to the speaker 30. Thereafter, the procedure returns to step S2 to repeat processes onward.

When the through output is instructed, the AV signals provided by the NTSC decoder 8 are output from the monitor 20 or the speaker 30 without being recorded on the hard disk 5A.

By referring to the flowcharts of FIGS. 3 and 4, and FIGS. 5 to 8, described next is a disk recording/reproduction process in a case where recording and reproduction are performed at the same time.

Figure 3:
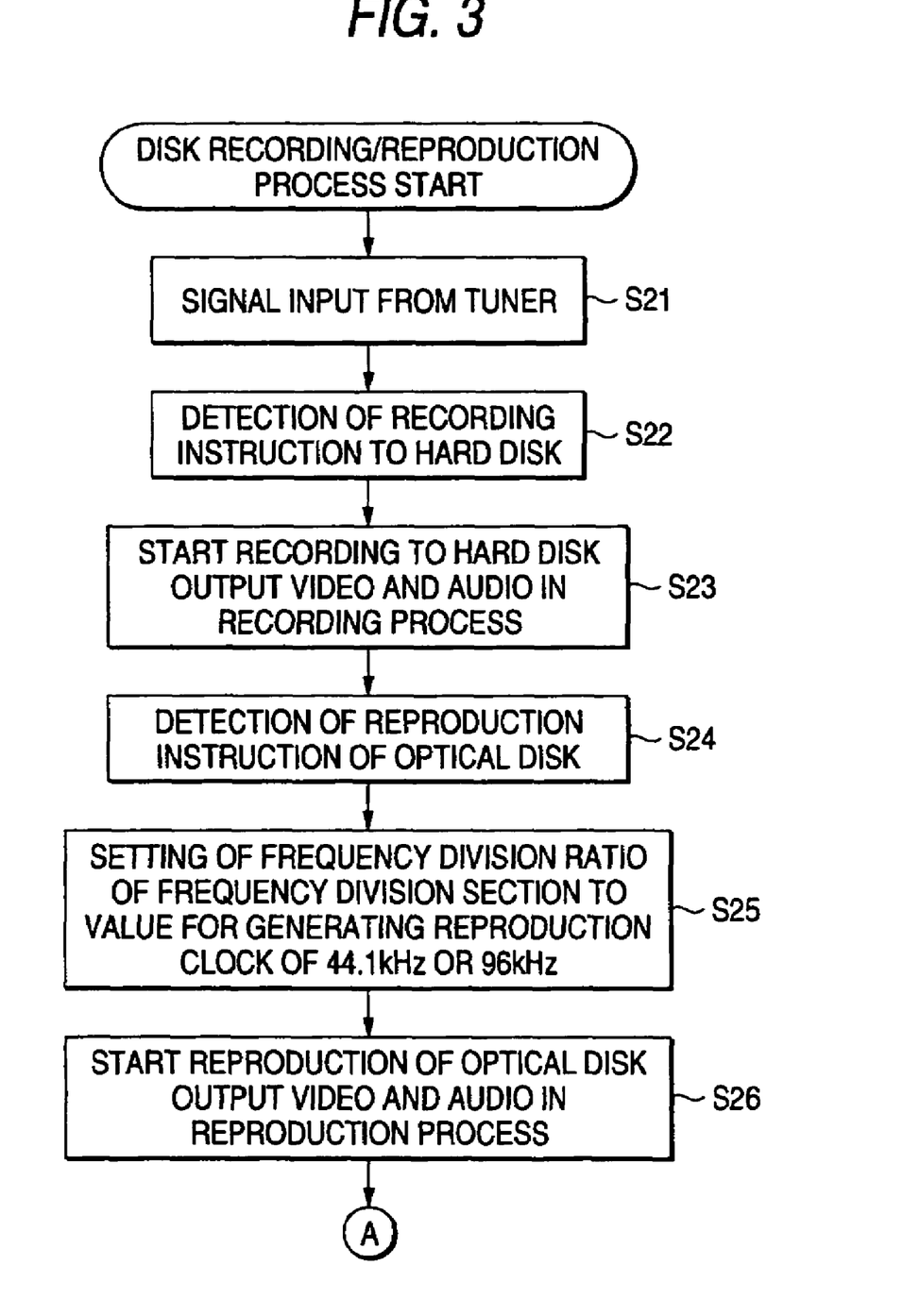
FIG. 3 is a flowchart for illustrating a disk recording/reproduction process of the disk recording/reproduction apparatus of FIG. 1.

In an exemplary case where the user makes an instruction for recording of AV signals of a predetermined channel received from an analog tuner (not shown), in step S21, the selection section 11 inputs the AV signals thus output from the tuner.

In response to the user's instruction coming over the user interface asking to start recording to the hard disk 5A, in step S22, the control section 2 detects such an instruction. In step S23, the control section 2 exercises control over the recording/reproduction section 5 to start recording of the AV signals received in the process of step S21 onto the hard disk 5A. At this time, as described in the foregoing, the frequency fsrec for the recording clock is 48 kHz that has been set in step S1 of FIG. 2.

Further, at this time, as already described above, out of the AV signals recoded on the hard disk 5A after provided by the NTSC decoder 8 for encoding in the encoder 13, the video signals are input to the NTSC encoder 16 via the video signal processing section 15 for encoding therein, and then the encoding result is output to the monitor 20 for display thereon. Moreover, the audio signals as a part of the AV signals provided by the NTSC decoder 8 are output from the speaker 30 after subjected to D/A conversion by the D/A converter 17.

Figure 5:
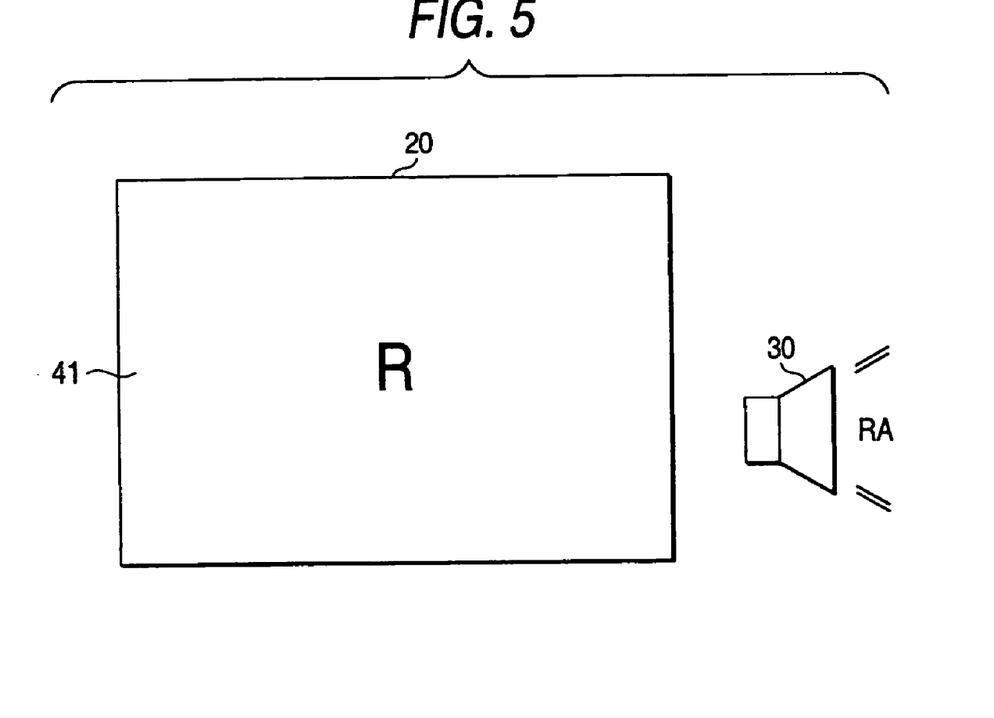
FIG. 5 is a diagram showing the relationship between a video and audio currently in an output process.

As such, for example, the monitor 20 displays an image 41 having been recorded on the hard disk 5A as shown in FIG. 5, and the speaker 30 outputs audio RA corresponding to the recorded image.

Under such circumstances, in an exemplary case where the user makes an instruction to reproduce the optical disk 5B, in step S24, the control section 2 detects such a user's reproduction instruction made with respect to the optical disk. In this case, in step S25, the control section 2 sets a frequency-division ratio to the frequency division section 4B in such a manner that the clock to be generated has the frequency of 44.1 kHz or 96 kHz. The clock frequency is set to 44.1 kHz when the reproducing optical disk 5B is a CD or a video CD, and set to 96 kHz with a DVD.

In step S26, the control section 2 exercises control over the recording/reproduction section 5 to start reproduction of the optical disk 5B, so that the resulting reproduction video and reproduction audio are both output.

That is, the decoder 14 decodes the AV data reproduced from the optical disk 5B in synchronization with the clock provided by the frequency division section 4B, outputs the video data to the video signal processing section 15, and outputs the audio data to the D/A converter 17.

The video signal processing section 15 displays thus received video signals on the monitor 20 via the NTSC encoder 16. Also, the D/A converter 17 subjects thus received audio signals to D/A conversion, and outputs the conversion result from the speaker 30.

Figure 6:
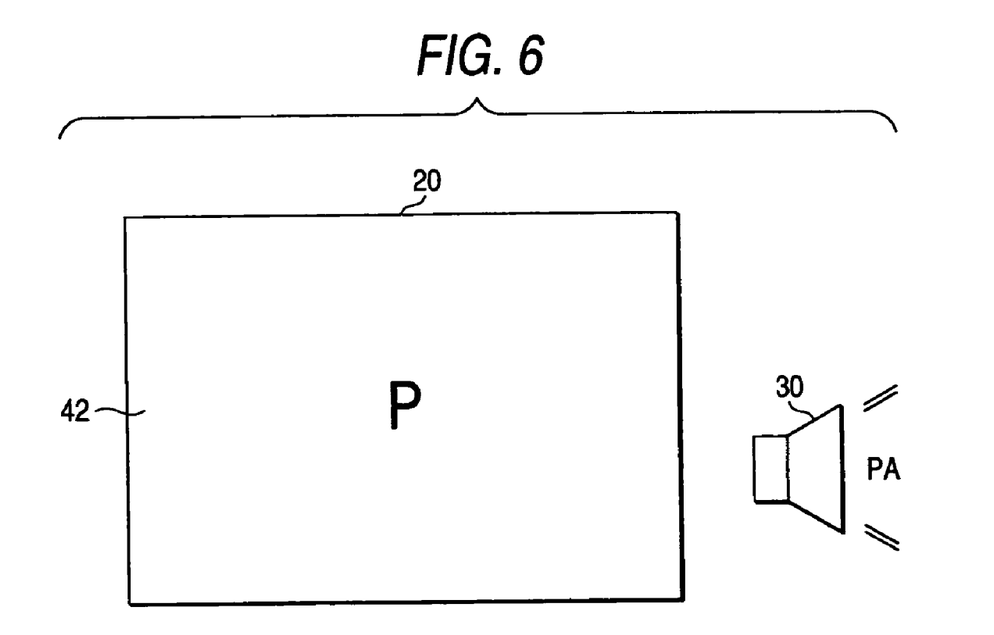
FIG. 6 is a diagram showing the relationship between a video and audio currently in the output process.

After the processes executed as such, as shown in FIG. 6, the monitor 20 accordingly displays a reproduction image 42, and the speaker 30 outputs reproduction audio PA corresponding to the reproduction image 42.

At this time, the frequency of the clock provided to the D/A converter 17 shows a change. However, due to the fact that the clocks are each separately generated in the frequency division sections 4A and 4B, there is no need to wait until clock stabilization is derived. Accordingly, no audio interruption occurs at switching, thereby achieving instantaneous smooth switching.

In the below, described is a case where the user makes an instruction for a PinP (Picture in Picture) mode by exercising control over the user interface with a desire to display two videos on the monitor 20 at the same time due to the state in which the optical disk 5B is instructed to be reproduced while the tuner input is recorded onto the hard disk 5A.

When the control section 2 detects the instruction for PinP mode in step S27, in step S28, the control section 2 exercises control over the video signal processing section 15 to make it select videos (videos instructed for processing most recently) currently reproduced from the optical disk 5B as a master screen, and select videos (videos instructed previously for processing) having been recorded onto the hard disk 5A as a slave screen.

Moreover, the control section 2 exercises control over the D/A converter 17 to make it select audio of the optical disk 5B selected as the master screen for audio. That is, in this case, selected is the audio corresponding to the reproduction videos.

In more detail, based on the control applied by the control section 2, the video signal processing section 15 executes an image combination process in such a manner that reproduction images from the optical disk 5B provided by the decoder 14 are regarded as the master screen, and images provided by the NTSC decoder 8 are regarded as the slave screen. The results are output to the monitor 20 via the NTSC encoder 16 for display thereon. Moreover, the D/A converter 17 is controlled by the control section 2, and outputs audio signals of the reproduction AV signals coming from the decoder 14.

Figure 7:
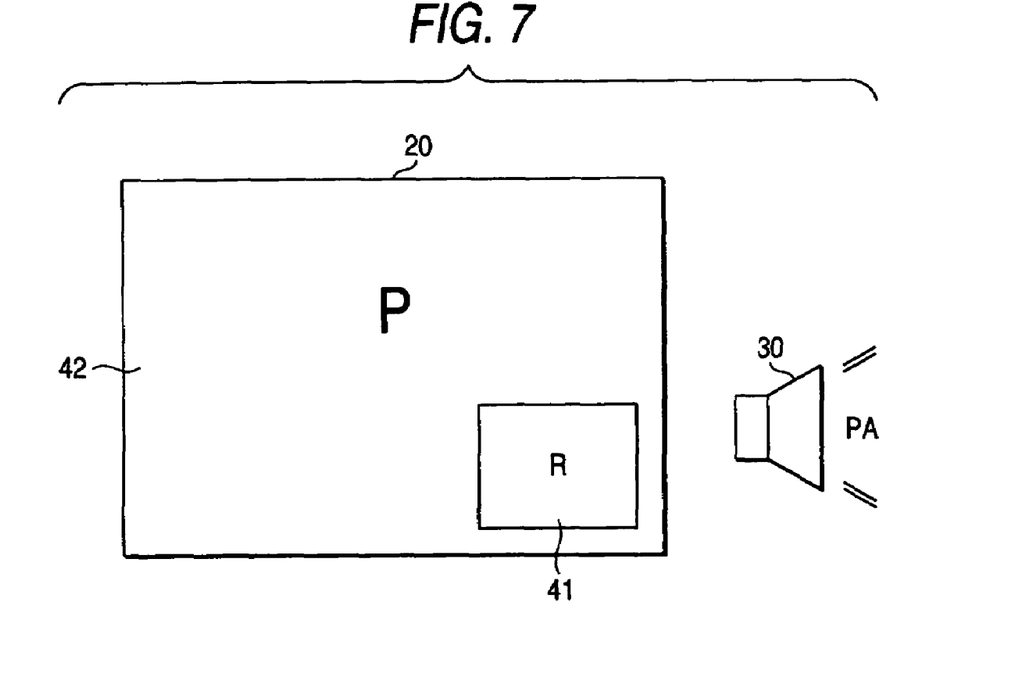
FIG. 7 is a diagram showing the relationship between a video and audio currently in the output process in PinP mode.

In such a manner, as shown in FIG. 7, in this case, the monitor 20 displays, in PinP mode, the results derived by combining the reproduction image 42 coming from the optical disk 5B as the master screen and a recording image 41 coming from the NTSC decoder 8 as the slave screen. Then, output from the speaker 30 is the reproduction audio PA corresponding to the reproduction image 42 as the master screen.

Figure 4:
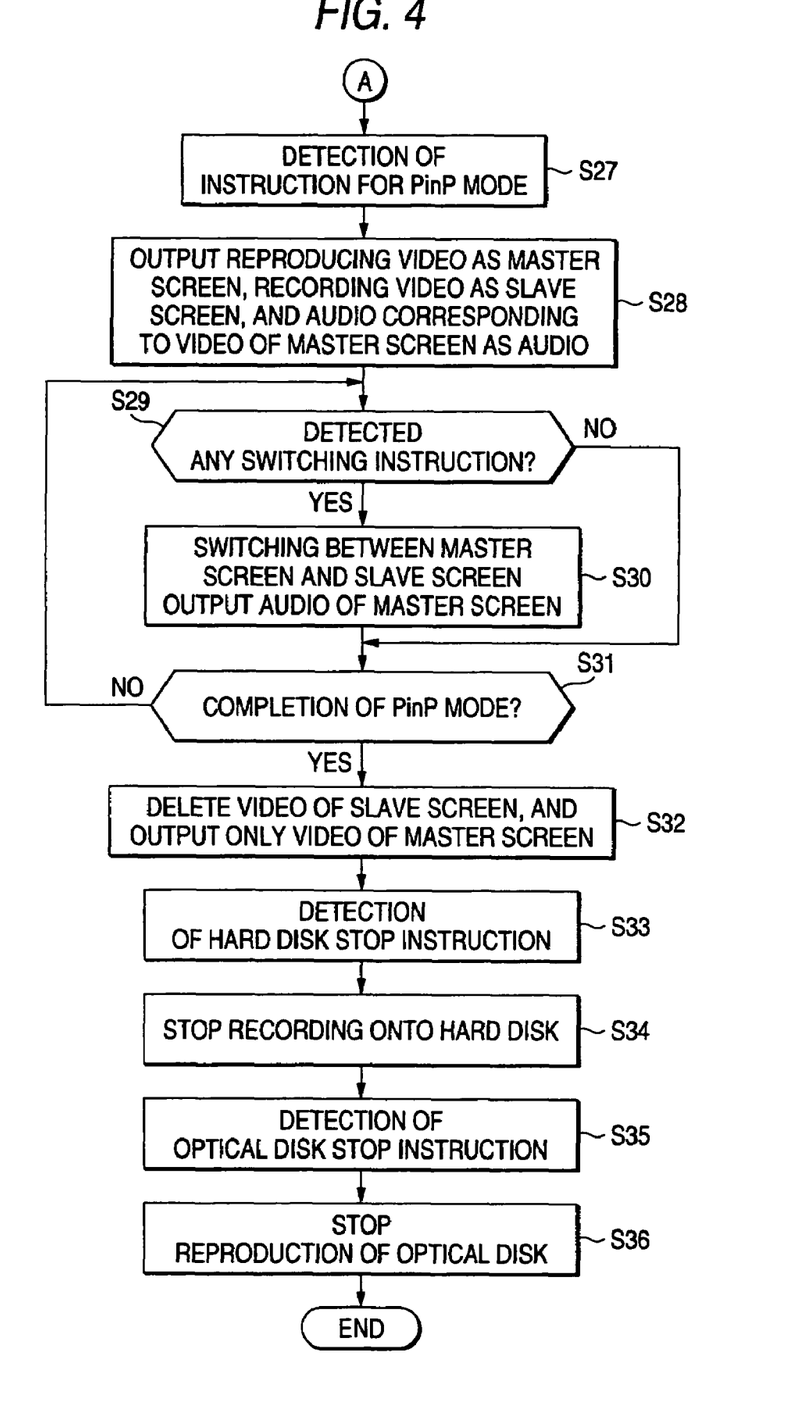
FIG. 4 is a flowchart for illustrating the disk recording/reproduction process of the disk recording/reproduction apparatus of FIG. 1.

For switching between the images of the master screen and the images of the slave screen, the user makes an instruction for such switching. In response, in step S29, the control section 2 determines whether such a user's instruction for image switching is detected, and if determined as detected, the procedure goes to step S30 for a process of switching the images of the master screen and the images of the slave screen. Also, the switching process is executed in such a manner that audio signals corresponding to the recording image 41 after newly switched to the master screen are output to the speaker 30.

Figure 8:
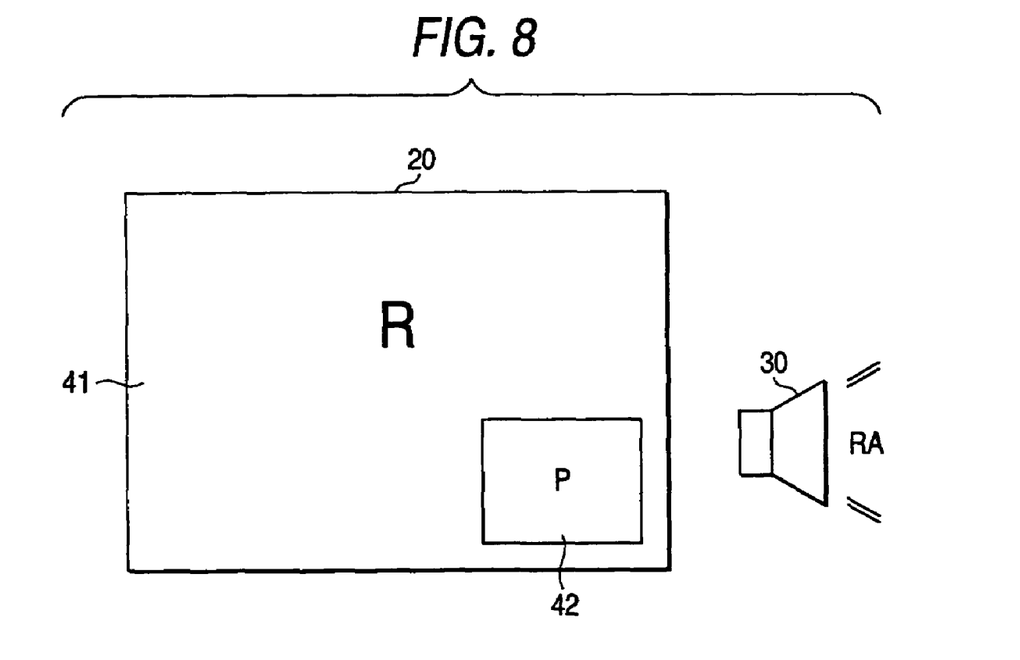
FIG. 8 is a diagram showing the relationship between a video and audio currently in the output process in PinP mode.

That is, as shown in FIG. 7, the reproduction image 42 is displayed as the master screen, and as to the recording image 41 having been displayed as the slave screen, as shown in FIG. 8, the recording image 41 is now displayed as the master screen, and the reproduction image 42 is displayed as the slave screen. Then, output from the speaker 30 is the recording audio RA corresponding to the recording image 41 as the master screen. Also in this case, due to the fact that the clocks are each separately generated, switching is instantaneously performed without causing interruption.

In step S29, if determined that no switching instruction has been detected, the process of step S30 is skipped.

After the process of step S30 is through, or in step S29, if determined that no switching instruction has been detected, the control section 2 determines in step S31 whether or not an instruction has been made to end the PinP mode. If not instructed to end the PinP mode, the procedure returns to step S29 to repeat the processes onward.

In step S31, if determined that the instruction made to end PinP mode has been detected, the procedure goes to step S32. The control section 2 then deletes the video of the slave screen, and exercises control over the video signal processing section 15 to make it output only the videos of the master screen. Moreover, the control section 2 exercises control over the D/A converter 17 to make the speaker 30 select the audio corresponding to the master screen for output.

Thereafter, when the user makes an instruction to end recording to the hard disk 5A, in step S33, the control section 2 detects such an instruction. In this case, in step S34, the control section 2 exercises control over the recording/reproduction section 5 to stop the data recording operation to the hard disk 5A.

Moreover, when the user makes an instruction to end the reproduction from the optical disk 5B, in step S35, the control section 2 detects such an optical disk reproduction end instruction. Then in step S36, the recording/reproduction section 5 is so controlled as to end the reproduction process with respect to the optical disk 5B.

As such, the frequency division section 4A for generating clocks of the frequency fsrec for controlling audio to be recorded (controlling the hard disk 5A) is provided separately from the frequency division section 4B for generating clocks of the frequency fspb for controlling audio to be reproduced (controlling the optical disk 5B). With such a structure, even if the clock frequency varies between recording clocks and reproduction clocks, those can be generated at the same time.

Accordingly, this enables instantaneous audio switching between recording and reproduction (disk switching, or content switching).

Described above is the case where the hard disk 5A and the optical disk 5B are used as recording media for recording in the recording/reproduction section 5. However, the recording media are not restricted thereto. Moreover, in the above embodiment, described is the case where the two video signals are displayed in PinP mode at the same time, and each corresponding audio signals are switched to each other for output. However, the objects for the switching process are not restricted to such audio signals, and video signals may be regarded as objects for switching.

The above-described series of processes may be executed by hardware, or executed by software. If such a series of processes are executed by the software, the corresponding software program is installed over a network or from a program storage medium to a computer incorporated in any hardware designed specifically therefor, or exemplarily general-purpose personal computer having various capabilities with various programs installed therein.

As shown in FIG. 1, separately from the apparatus itself, the program storage medium is exemplified by package media including a program-installed magnetic disk 101, optical disk 102, magneto-optical disk 103, semiconductor memory 104, or others, which is distributed for the purpose of program provision to users.

Note that in this Description, the step of installing a program to be recorded on a program storage medium also includes, in addition to processes to be executed in a time series in the described order, processes to be executed not necessarily in a time series but in parallel or separately.

INDUSTRIAL APPLICABILITY

As described in the foregoing, according to the present invention, any different recording media can be reproduced at the same time. What is more, even if clock frequency is varying for reproducing any two recording media, instantaneous switching can be achieved without causing content interruption.

The invention claimed is:

1. A reproduction apparatus comprising:
frequency clock generation means for generating a recording clock frequency and a reproduction clock frequency;
first electronic storage means for storing electronic data;
second electronic storage means for storing electronic data;
wherein the first electronic storage means utilizes the recording clock frequency to reproduce the electronic data, and
wherein the second electronic storage means utilizes reproduction clock frequency to reproduce the electronic data;
selection means for selecting either the recording clock frequency or the reproduction clock frequency as a function of user input;
converting means for converting the electronic data as a function of the selected clock frequency; and
outputting means for outputting the converted,
wherein the recording clock frequency and the reproduction clock frequency are generated by dividing a fixed clock frequency according to a predetermined ratio,
wherein the predetermined ratio is set according the fixed clock frequency, the recording clock frequency, and the reproduction clock frequency, and
wherein the fixed clock frequency is maintained upon generating the recording clock frequency and the reproduction clock frequency so that a waiting period for clock stabilization is removed.

2. An apparatus, comprising:
first clock frequency generating means for generating a first clock frequency;
second clock frequency generating means for generating a second clock frequency, the second clock frequency being different from the first clock frequency;
determining means for determining an instruction provided by a user;
control means for determining whether a signal to be reproduced from a first storage medium has a sampling frequency equal to the second clock frequency;
wherein the control means sets a frequency division ratio to generate a clock frequency equal to the sampling frequency when the sampling frequency is not equal to the second clock frequency;
clock selecting means for selecting a reproduction clock control provided by the frequency division ratio based on the instruction provided by the user;
wherein when the instruction is a recording instruction: the control means selects the first clock frequency; and
outputting means for outputting either a signal based on the first clock frequency or outputting a signal based on the second clock frequency,
wherein the first clock frequency and the second clock frequency are generated by dividing a fixed clock frequency according to a predetermined ratio,
wherein the predetermined ratio is set according the fixed clock frequency, the first clock frequency, and the second clock frequency, and
wherein the fixed clock frequency is maintained upon generating the first clock frequency and the second clock frequency so that a waiting period for clock stabilization is removed.

3. An apparatus, comprising:
frequency dividing means for frequency-dividing a predetermined master clock for outputting a first clock frequency, and for frequency-dividing the predetermined master clock for outputting a second clock frequency, the second clock frequency being different from the first clock frequency;
determining means for determining an instruction provided by a user is a reproduction instruction or a recording instruction;
control means for determining whether a signal to be reproduced from a first storage medium has a sampling frequency equal to the second clock frequency;
wherein when the sampling frequency is not equal to the second clock frequency: the control means sets a frequency division ratio to generate a clock frequency equal to the sampling frequency;
clock selecting means for selecting the second clock frequency provided by the frequency dividing means based on the instruction provided by the user;
converting means for converting the signal based on the second clock frequency;
wherein when the instruction is a recording instruction: the control means selects the first clock frequency;
converting means for converting the signal based on the first clock frequency; and
outputting means for outputting either the converted signal based on the first clock frequency or outputting the converted signal based on the second clock, wherein the pre-determined master clock is maintained upon generating the first clock frequency and the second clock frequency so that a waiting period for clock stabilization is removed.

4. The apparatus as claimed in claim 3,
wherein the determining means determines whether the instruction provided by the user is a through output instruction, and
wherein the outputting means outputs the signals without recording the signals.

5. An apparatus comprising:
frequency dividing means for frequency-dividing a predetermined master clock for outputting a first clock frequency, and for frequency-dividing the predetermined master clock for outputting a second clock frequency, the second clock frequency being different from the first clock frequency;
determining means for determining an instruction provided by a user;
wherein upon determination of a recording instruction: control means initiates recording signals to a first memory medium, using the first clock frequency;
displaying means for displaying the recorded signals;
wherein upon determination of a reproducing instruction: the control means sets a frequency-division ratio to generate the second clock frequency and initiates reproduction of the signals to a second memory medium,
wherein the pre-determined master clock is maintained upon generating the first clock frequency and the second clock frequency so that a waiting period for clock stabilization is removed.

6. The apparatus as claimed in claim 5,
wherein the determining means determines a user instruction for a selected mode of display;
wherein the control means selects first signals from the first memory medium to be displayed as a master screen; and selects second signals from the second memory medium to be displayed as a slave screen, and
wherein the displaying means displays the selected first signals and selected second signals in a picture in picture mode.

7. The apparatus as claimed in claim 6,
wherein the master and slave screens are switched with each other.

8. A reproduction method comprising:
generating a recording clock frequency and a reproduction clock frequency;
storing electronic data on a first electronic storage device that utilizes the recording clock frequency to reproduce the electronic data;
storing the electronic data on a second electronic storage device that utilizes the reproduction clock frequency to reproduce the electronic data;
selecting either the recording clock frequency or the reproduction clock frequency as a function of user input;
converting the electronic data as a function of the selected clock frequency; and
outputting the converted electronic data,
wherein the recording clock frequency and the reproduction clock frequency are generated by dividing a fixed clock frequency according to a predetermined ratio,
wherein the predetermined ratio is set according the fixed clock frequency, the recording clock frequency, and the reproduction clock frequency, and wherein the fixed clock frequency is maintained upon generating the recording clock frequency and the reproduction clock frequency so that a waiting period for clock stabilization is removed.

9. A method, comprising:
generating a first clock frequency;
generating a second clock frequency, the second clock frequency being different from the first clock frequency;
determining an instruction provided by a user,
wherein when the instruction is a reproduction instruction:
whether a signal to be reproduced from a first storage medium has a sampling frequency equal to the second clock frequency is determined; and
a frequency division ratio to generate a clock frequency equal to the sampling frequency is set when the sampling frequency is not equal to the second clock frequency; and
a reproduction clock control is selected provided by the frequency division ratio based on the instruction provided by the user;
wherein when the instruction is a recording instruction: the first clock frequency is selected; and
outputting either a signal based on the first clock frequency or outputting a signal based on the second clock frequency,
wherein the first clock frequency and the second clock frequency are generated by dividing a fixed clock frequency according to a predetermined ratio,
wherein the predetermined ratio is set according the fixed clock frequency, the first clock frequency, and the second clock frequency, and
wherein the fixed clock frequency is maintained upon generating the first clock frequency and the second clock frequency so that a waiting period for clock stabilization is removed.

10. A method, comprising:
frequency-dividing a predetermined master clock for outputting a first clock frequency, and for frequency-dividing the predetermined master clock for outputting a second clock frequency, the second clock frequency being different from the first clock frequency;
determining which of a reproduction instruction or a recording instruction is provided by a user;
wherein when the instruction is a reproduction instruction:
whether a signal to be reproduced from a first storage medium has a sampling frequency equal to the second clock frequency is determined;
a frequency division ratio to generate a clock frequency equal to the sampling frequency is set when the sampling frequency is not equal to the second clock frequency; and
the second clock frequency is selected provided by the frequency division ratio based on the instruction provided by the user; and
the signal is converted based on the second clock frequency;
wherein when the instruction is a recording instruction:
the first clock frequency is selected; and
the signal is converted based on the first clock frequency; and
outputting either the converted signal based on the first clock frequency or outputting the converted signal based on the second clock frequency,
wherein the pre-determined master clock is maintained upon generating the first clock frequency and the second clock frequency so that a waiting period for clock stabilization is removed.

11. The method as claimed in claim 10,
wherein whether the instruction provided by the user is from an output instruction is determined, and
wherein the signals are outputted without recording the signals.

12. A method, comprising:
frequency-dividing a predetermined master clock for outputting a first clock frequency, and for frequency-dividing the predetermined master clock for outputting a second clock frequency, the second clock frequency being different from the first clock frequency;
determining an instruction provided by a user;
wherein upon determination of a recording instruction:
recording signals to a first memory medium using the first clock frequency is initiated;
displaying the recorded signals; and
wherein upon determination of a reproducing instruction:
a frequency-division ratio to generate the second clock frequency is set; and
reproduction of the signals to a second memory medium is initiated, and
wherein the pre-determined master clock is maintained upon generating the first clock frequency and the second clock frequency so that a waiting period for clock stabilization is removed.

13. The method as claimed in claim 12,
wherein when the a user instruction is determined for a selected mode of display: first signals from the first memory medium is selected to be displayed as a master screen; and second signals from the second memory medium is selected to be displayed as a slave screen,
wherein the selected first signals and selected second signals are displayed in a picture-in-picture mode.

14. The method as claimed in claim 13,
wherein the master and slave screens are switched with each other.

15. A system comprising:
at least one processing device; and
one or more electronic memory devices that includes one or more computer-readable storage media for storing a computer program that when executed on the at least one processing device implements a reproduction method, the method comprising:
generating a recording clock frequency and a reproduction clock frequency;
storing electronic data on a first electronic storage device that utilizes the recording clock frequency to reproduce the electronic data;
storing the electronic data on a second electronic storage device that utilize the reproduction clock frequency to reproduce the electronic data;
selecting either the recording clock frequency or the reproduction clock frequency as a function of user input;
converting the electronic data as a function of the selected clock frequency; and
outputting the converted electronic data,
wherein the recording clock frequency and the reproduction clock frequency are generated by dividing a fixed clock frequency according to a predetermined ratio,
wherein the predetermined ratio is set according the fixed clock frequency, the recording clock frequency, and the reproduction clock frequency, and
wherein the fixed clock frequency is maintained upon generating the recording clock frequency and the reproduction clock frequency so the a waiting period for clock stabilization is removed.

* * * * *